Sept. 11, 1928.  W. M. BROWN  1,683,653

CONVEYER

Filed Sept. 24, 1926

Witnesses:
Edwin Trueb

Inventor:
WILLIAM MILTON BROWN,
by D. Anthony Usina
his Attorney

Patented Sept. 11, 1928.

1,683,653

UNITED STATES PATENT OFFICE.

WILLIAM MILTON BROWN, OF JOHNSTOWN, PENNSYLVANIA.

CONVEYER.

Application filed September 24, 1926. Serial No. 137,459.

This invention relates to conveyers of the scraper type, and more particularly to scraper or drag bars for conveyers of this type, and has for its object the provision of a conveyer in which the scraper or drag bars will hug or ride on the conveyer pan when they pass over the sprockets at either the loading or discharge end of the conveyer.

Heretofore the scraper or drag bars have been positioned to one side or the other of the vertical center of the links of the chain to which they are attached, and when they pass over the sprockets at either end of the conveyer they are lifted above the conveyer pan due to the angle assumed by the links in passing around the sprockets, thus allowing the material being conveyed to pass freely under the bar.

Another object is to provide a conveyer in which the scraper or drag bars are permanently welded to the links of the chain so as to prevent accidental misplacement and loss of the bars.

Figure 1:
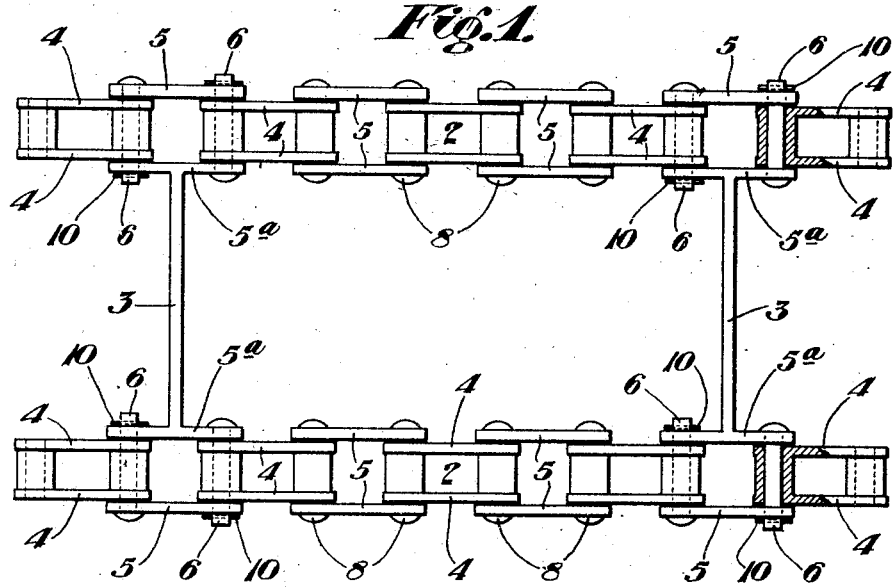
Figure 1 is a fragmentary plan view illustrating a portion of a conveyer constructed in accordance with the present invention.
Figure 2:
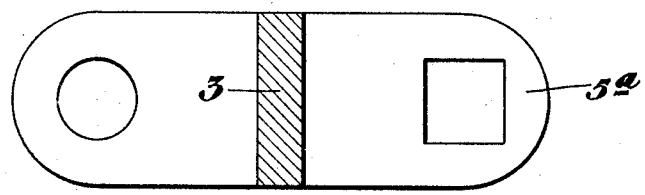
Figure 2 is a sectional view of one of the scraper or drag bars.
Figure 3:
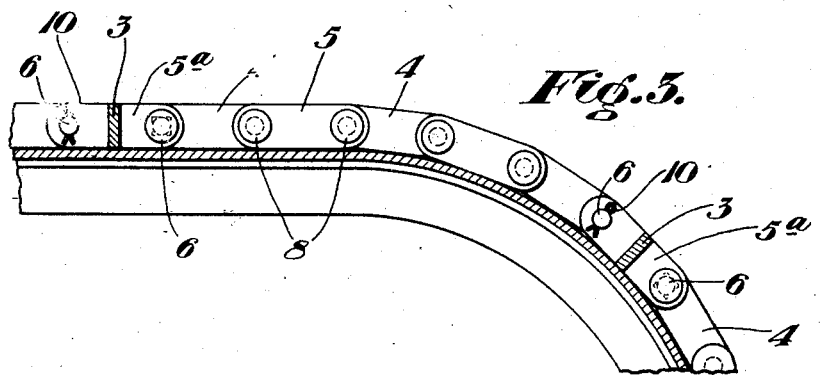
Figure 3 is a sectional view showing the position of the scraper or drag bars as they pass around the sprocket at the end of a conveyer.

Referring more particularly to the drawings, the numeral 2 designates the conveyer chains as a whole, which are connected by the transverse scraper or drag bars 3. The chains 2 broadly, each comprise inner links 4 and outer links 5 pivotally connected by pivot pins 6.

The pins 6 are upset at both ends as at 8 to hold the links together except at the points where the scraper or drag bars are mounted. The special inside links 5ª carrying the drag bars 3 are of special form in that they are permanently welded to the bars. The pivot pins 6 connecting the links carrying the scraper or drag bars are headed or upset at one end and have their other ends provided with cotter pins 10 for locking the pivot pins in position.

The scraper or drag bar members are composed of a rectangular bar 3 which is arranged edgewise and has its ends welded to a pair of outside links 5ª at their vertical center line. The rigid and permanent mounting of the drag bars 3 at the vertical center line of the links 5ª is the important feature of this invention, since scraper or drag bars thus mounted will hug or ride on the conveyer pan when the chain is passing over or around the sprockets at either end of the conveyer and prevent the passage of the material being conveyed under the bars, and bars secured by welding to the links will not be pulled loose when the chains are thrown out of alinement for any reason.

While I have shown and described one specific embodiment of my invention, it will be understood that I do not wish to be limited thereto, since various modifications may be made without departing from the scope of my invention as defined in the appended claims.

I claim:

1. In an endless conveyer member of the chain and scraper type, wherein therein there is provided a pair of endless chains connected at intervals by transverse scraper bars, special outside links for said chains, and rectangular scraper bars permanently secured to said special links at their transverse centers.

2. A scraper bar for endless conveyers, comprising a pair of flat link members and a scraper bar extending between and rigidly and permanently secured to said links at their transverse centers.

In testimony whereof, I have hereunto signed my name.

WILLIAM MILTON BROWN.